United States Patent
Lavi et al.

(10) Patent No.: US 9,628,701 B2
(45) Date of Patent: Apr. 18, 2017

(54) VEHICULAR SOCIAL MEDIA SYSTEM

(71) Applicant: GM GLOBAL TECHNOLOGY OPERATIONS LLC, Detroit, MI (US)

(72) Inventors: Nadav Lavi, Ramat-Hasharon (IL); Amir Konigsberg, Herzliya Pituach (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/263,267

(22) Filed: Apr. 28, 2014

(65) Prior Publication Data

US 2015/0312474 A1 Oct. 29, 2015

(51) Int. Cl.
*H04N 5/225* (2006.01)
*G08B 23/00* (2006.01)
*G06F 17/00* (2006.01)
*H04N 5/232* (2006.01)

(52) U.S. Cl.
CPC ..... *H04N 5/23222* (2013.01); *H04N 5/23216* (2013.01)

(58) Field of Classification Search
CPC ... B60R 25/1004; B60W 40/09; B60W 50/08; G01C 21/26; G01C 21/36; G01C 21/3647; G06F 17/30247; G06F 17/30557; G06F 17/30864; G06F 21/00; G06F 21/32; G06F 3/0488; G06K 9/00268; G06Q 30/0639

USPC ............... 348/375; 340/576; 701/45; 706/20
See application file for complete search history.

(56) References Cited

U.S. PATENT DOCUMENTS

| | | | |
|---|---|---|---|
| 6,756,903 B2* | 6/2004 | Omry | B60K 28/066 340/425.5 |
| 8,686,844 B1* | 4/2014 | Wine | G08G 1/20 340/438 |
| 2002/0171553 A1* | 11/2002 | Omry | B60K 28/066 340/576 |
| 2005/0030184 A1* | 2/2005 | Victor | B60K 28/06 340/576 |
| 2008/0056542 A1* | 3/2008 | Hung | H04N 5/4403 382/118 |
| 2013/0253756 A1* | 9/2013 | Matsuno | B60W 30/182 701/29.2 |
| 2014/0121928 A1* | 5/2014 | Kurumisawa | B60T 8/1755 701/70 |

* cited by examiner

*Primary Examiner* — Trung Diep
(74) *Attorney, Agent, or Firm* — Lorenz & Kopf, LLP

(57) ABSTRACT

A social media system for a vehicle and a method of operating the social media system are provided. The social media system, for example, may include, but is not limited to a camera, an interface, a memory configured to store one or more safety settings, and a processor communicatively coupled to the camera, the interface and the memory, the processor being configured to receive, via the interface, a command request to utilize the social media system, determine, based upon the safety settings stored in the memory, when the command request may be completed, and executing the command request when the processor determines that command request may be completed.

20 Claims, 2 Drawing Sheets

VEHICULAR SOCIAL MEDIA SYSTEM

TECHNICAL FIELD

The technical field generally relates to vehicles, and more particularly to safely operating a social media photo and video capturing system in a vehicle.

BACKGROUND

Social media is a widespread phenomenon. In particular, many people enjoy sharing media such as photographs and video with their friends and family. One popular social media phenomenon is the "selfie," a photograph or video taken by a user with a cell phone camera or other handheld cameras held at arm's length. However, taking or sharing "selfie" photographs or video in certain circumstances, such as when driving a vehicle, is not advisable.

Accordingly, it is desirable to provide systems and methods for providing a system for managing social media and photo and video capturing. Furthermore, other desirable features and characteristics of the present invention will become apparent from the subsequent detailed description and the appended claims, taken in conjunction with the accompanying drawings and the foregoing technical field and background.

SUMMARY

In accordance with an embodiment, a social media system is provided. The social media system may include, but is not limited to, a camera, an interface, a memory configured to store one or more safety settings, and a processor communicatively coupled to the camera, the interface and the memory, the processor being configured to receive, via the interface, a command request to utilize the social media system, determine, based upon the safety settings stored in the memory, when the command request may be completed, and executing the command request when the processor determines that command request may be completed.

In accordance with another embodiment, a method for operating a social media system in a vehicle is provided. The method may include, but is not limited to receiving, by a processor, a command request to utilize the social media system, determining, by the processor, when the command request may be completed based upon at least one safety rule, and executing the command request when the processor determines that command request may be completed.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As discussed above, taking or sharing media, such as photographs and video, while in a vehicle is not advisable. Accordingly, a social media system for a vehicle is provided herein which allows a driver or other passenger of a vehicle to acquire and share media.

Figure 1:
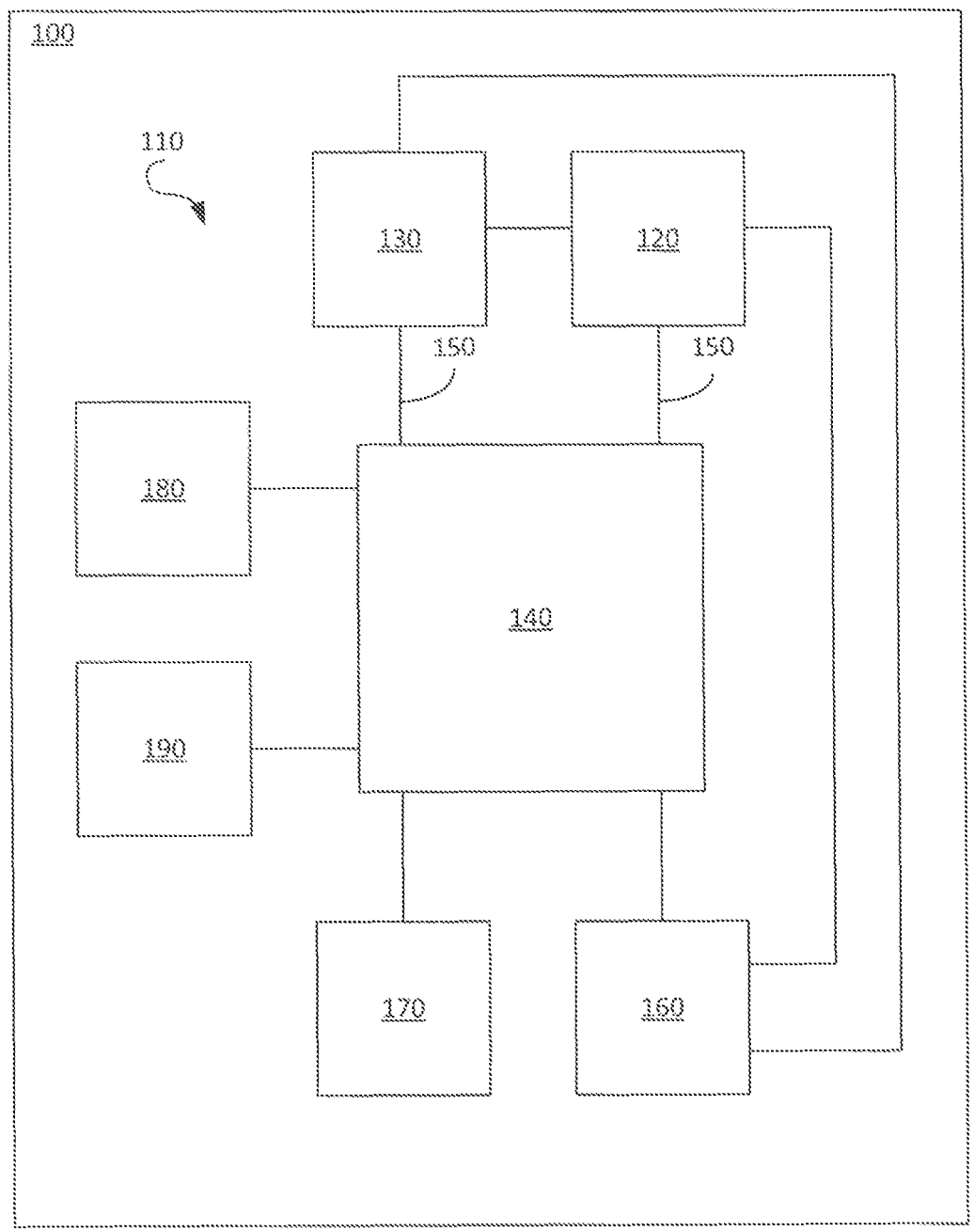
FIG. 1 is a block diagram of an exemplary vehicle, in accordance with an embodiment.

FIG. 1 is a block diagram of an exemplary vehicle 100, in accordance with an embodiment. The vehicle 100 may be, for example, an automobile, a motorcycle, a motorized bicycle, an aircraft, a spacecraft, a watercraft, or any combination thereof. The vehicle 100 includes a social media system 110 for acquiring media (such as photographs and/or video) and sharing the media through one or more social networks.

The social media system 110 includes at least one camera 120. In one embodiment, for example, the camera 120 may be incorporated into the vehicle. The camera 120, for example may be mounted on or in a dash of the vehicle 100, incorporated into a structural pillar (i.e., the A pillar, B pillar, C pillar, etc.), incorporated into the roof of the vehicle 100, incorporated into a mirror structure of the vehicle 100 (i.e., rear view mirror, side view mirrors, etc.), incorporated on a windshield of the vehicle 110, or otherwise incorporated into any other interior or exterior structure within the vehicle 100.

In another embodiment, for example, the camera 120 may be removable from the vehicle. The camera 120, for example, may be a dedicated portable camera (e.g., a "point and shoot" digital camera, a camcorder, a DSLR camera, a mirrorless camera, a film camera, etc.) or the camera 120 may be part of another electronic device, such as a cell phone, tablet, laptop or the like. In this embodiment, for example, the camera 120 may be temporarily mounted in the vehicle 100 in a dock 130. In one embodiment, for example, the dock 130 may simply securely hold the camera 120. However, in other embodiments the dock 130 may aid in the control of the camera 120, as discussed in further detail below.

At least one camera 120 is arranged to take pictures or video of the driver of the vehicle 100. However, the vehicle 100 may have multiple cameras 120. The other cameras 120 may be arranged to take pictures or video of other passengers in the vehicle 110 in another front passenger seat, a rear seat or a combination thereof. In one embodiment, for example, a camera 120 may be arranged to take a picture or video of all of the passengers in the vehicle 100, including the driver. The vehicle 100 may further include one or more cameras 120 arranged to take pictures outside of the vehicle 100.

In one embodiment, for example, a camera 120 may be rotatable. In other words, a user may be able to rotate the camera 120 to take pictures or video of different passengers in the vehicle. In one embodiment, for example, a user may be able to send instructions to have the vehicle 100 rotate the camera 120. However, the camera 120 may alternatively be manually rotatable, or a combination of automatic and manually rotatable. The camera 120 mounted in the vehicle 100 or the dock 130 itself may be rotatable along one or more axis. Further, the driver may have access to controls to zoom the lens of the camera 120. In one embodiment, for example, the camera 120 may utilize face recognition technology to set up a photograph or video. In other words, the camera 120 may determine a location of a face of the driver or passenger and center the photograph or video based thereon.

The social media system 110 further includes at least one processor 140. The processor 140 may be a central processing unit (CPU), a graphics processing unit (GPU), an application specific integrated controller (ASIC), a microcontroller, a field programmable logic array (FPGA) or any other logic device or combination thereof. In one embodiment, for example, the processor 140 may be part of the vehicle. In this embodiment, the processor 140 may be dedicated to the social media system 110 or may be shared with other systems in the vehicle. In another embodiment, for example, the processor 140 may be part of the camera 120. For example, the processor in a smartphone or other dedicated camera may be used as the processor 140.

One or more cameras 120 in the vehicle 100 may be coupled to the processor 140 via either a wired communication bus 150 or via a wireless communication system 160. The wireless communication system 160, for example, may be a WiFi system, a Bluetooth system, a ZigBee system, a cellular system, or a system of any other wireless protocol, or any combination thereof. The camera 120 may also be communicatively connected to the dock 130 via a wired or wireless communication protocol. In these embodiments, for example, the dock 130 may then be coupled to the processor via one of the wired or wireless communication protocols to transfer data between the camera 120 and the processor 140. The wireless communication system 160 may also be utilized by the processor 140 to connect to one or more social networks to share the acquired media.

The social media system 110 further includes at least one interface 170. In one embodiment, for example, the interface 170 may include one or more steering wheel controls. The steering wheel controls may include one or more buttons, scroll wheels, paddles, or the like. In one embodiment, for example, the steering wheel may have dedicated buttons for one or more functions. For example, a button on the steering wheel may be dedicated for initiating capture of a photograph or a video. The interface 170, alternatively or in combination with the steering wheel controls, may include controls on a dash or console of the vehicle or controls on the camera 120 or other device itself (e.g., controls on an app on a cellular phone, or buttons on the camera, cell phone etc.). The dash, console or camera/device controls may include, but are not limited to, buttons, switches, scroll wheels, touch pads, touchscreens, or the like. The interface 170 may also include an audible control feature where a user may interact with the social media system 110 via voice commands, for example, to add a text message to a photograph or video being shared. In one embodiment, for example, the interface 170 may also include a display. In one embodiment, for example, the display may be a liquid crystal display (LCD), an organic light emitting diode display (OLED), or a heads-up display, however, any display type may be used. In one embodiment, for example, the display may be used to view the acquired media before the media is transmitted and/or saved. Further, any combination of interfaces is possible.

The social media system, 100 further includes at least one memory 180. The memory 180 may be any combination of volatile and non-volatile memory. In one embodiment, for example, the memory 180 may store non-transitory computer-readable medium instructions, which when executed by the processor 140, execute the social medium system 110. The memory 180 may be a dedicated part of the vehicle 100, part of the camera 120, part of a device having a camera (e.g., a memory in a cell phone or other device), or a combination thereof.

The memory 180 may also store settings for the social media system 110. The settings may include operational setting, such as media acquisition settings and media sharing settings, as well as safety settings, as discussed in further detail below. The processor 140 may generate a menu system on a display of the interface 170 which, in conjunction with other elements in the interface 170, may allow a user to adjust the operational setting and safety settings for the social media system 110. In some embodiments, the processor 140 may also store the acquired media in the memory 180. Further, the processor 140 may store context information with the acquired media. For example, the processor 140 may store a date, time and/or location with each acquired media file.

The operational settings may include default settings for acquiring and sharing media. A user, for example, can set the default acquisition method to be a photograph rather than a video. Likewise, a user can set up one or more default sharing destinations. The sharing destinations may include one or more social networks, one or more email addresses, one or more cell phones (e.g., to transmit via text message, etc.), storage locations (e.g., a cloud based storage), or the like. The default settings may also include settings for the media itself. For example, a user could set a default video length, default color settings (e.g., color, black and white, color balance, etc.), default format (e.g., jpeg, mpeg, etc.) default compression ratio, and default resolution. The default setting may also include restrictions related to use, for example, restrictions as when or where a camera can or cannot be used, as well as setting changes that should be applied on some occasions and not in others. An additional default setting may relate to cases when the social media system 140 is overridden by another system, for example, a smartphone or a tablet, or an embedded system, or when the social media system 140 overrides these other systems instead, for example, when resources such as power or connectivity are scarce. A user, via the interface 170 may temporarily or permanently change one of the operational settings. If, for example, the vehicle 100 includes multiple cameras 120, a user could permanently change the default camera or set up the next media acquisition to be taken by a non-default camera.

The operational settings may also include automatic trigger points. A user may set a certain location or a certain time as an automatic trigger to acquire media. For example, the user could set the automatic trigger to acquire a photograph of the driver each day on the way to work triggered by a certain location and/or time. Automatic triggers may also be set by any geographic location (particular places) or at any particular times (e.g., 16:00) or at any particular time intervals (e.g., every five minutes) or at any particular special intervals (e.g., every mile).

The operational settings may also allow bursts of photo taking at pre-set time intervals, for example, taking five photos or a 20 second video every five minutes, or every 1 mile, or on every entrance or exit from a highway or intersection.

The safety setting may include safety rules which limit when media may be acquired, whom can operate the social media system 110 and/or when the media can be shared. The safety rules may be based upon data from one or more sensors 190 in the vehicle. The sensors 190, for example, may include, but are not limited to a gaze/sleepiness detection system, vehicle awareness sensor systems (e.g., radar systems, lidar systems, or any other traffic awareness systems), position sensors (e.g., GPS systems or other position determining systems), speed sensors, ambient light sensors, occupancy sensors (i.e., who is in the car, are their passengers in the back, are there kids in the car, etc.) or any other type of sensor. Some of the safety rules may be user adjustable, while others may be limited by the manufacturer of the vehicle 100 or other safety organizations.

The safety rules may be based upon a single factor or a combination of multiple factors. One factor the processor 140 may consider is the absolute speed of the vehicle 100. In this instance, the processor 140 could limit or prohibit use of the social media system 110 when vehicle is travelling over a predetermined speed. The speed of the vehicle 100 may be determined by one of the sensors 190, such as a speed sensor or from GPS data.

Another possible factor is the speed of the vehicle relative to a speed limit corresponding to a location of the vehicle. In this instance, the processor 140 could limit or prohibit use of the social media system 110 when vehicle is travelling a predetermined speed over or under a posted speed limit. In this case the social media system 140 would be aligned with a loaded map with location specific speed limits and/or connected to a server based service that includes this type of info.

Yet another possible factor is traffic surrounding the vehicle. For example, the safety rules may limit or prohibit media acquisition in heavier traffic. One or more of the sensors 190 may detect other vehicles within a certain distance to the vehicle 100. If other vehicles are within a predetermined distance of the vehicle 100, the processor may limit or prohibit use of the social media system 110. In one embodiment, for example, the speed of the vehicle 100 may modify the predetermined distance. For example, if the vehicle is travelling at 25 miles per hour the predetermined distance between vehicles where the safety rules would allow the user to operate a component of the system may be significantly less than if the vehicle is driving at 45 miles per hour.

Yet another possible factor is the location of the vehicle 100. The safety rules could be set, for example, to allow, limit or prohibit use of the social media system 110 when the vehicle is on a highway, a surface street, stopped at stoplight, on an on-ramp or interchange, on a bridge, etc. A number of lanes of the road could also be taken into account. For example, the rules may allow a driver to use the social media system 110 on a one-lane highway, but limit or prohibit the use of the social media system 110 on multi-lane highways. In some instances the speed and/or traffic rules of the social media system 110 may be modified by a location factor. For example, an absolute speed limit limiting or prohibiting use of the social media system 110 for the vehicle may be higher on a highway than a surface street.

Another possible factor is a driver's gaze direction. The camera 120 or a dedicated camera in the vehicle may monitor a direction in which the driver is looking. The processor, for example, could limit or prohibit use of the social media system 110 when the user's gaze is not substantially directed towards a driving direction. Likewise, the camera 120 or a dedicated camera in the vehicle may monitor the driver for signs of sleepiness. Accordingly, another possible factor is the attentiveness of the driver. If the processor determines that the driver is sleepy or inattentive for other reasons, the processor could limit or prohibit use of the social media system 110.

Other possible factors are weather and time of day. The processor, for example, could limit or prohibit use of the social media system 110 when in certain weather conditions or certain lighting conditions, including, but not limited to, rain, snow, fog, icy roads, hail, dawn, dusk, night, day, etc.

In one embodiment, for example, the safety rules may also be based upon who is operating the social media system 110. In other words, the safety rules may differ for the driver and other passengers. As discussed above, speed, traffic and other factors may dictate when the social media system 110 can be operated. In one embodiment, for example, the speed limit for operating the social media system 110 may be lower for passengers operating the social media system 110 than for a driver. In other words, a driver may be prohibited from operating the social media system on a highway because the speed of the vehicle 100 is greater than an absolute speed limit for the system. However, the absolute speed limit may be higher for a passenger, allowing the passenger to utilize the social media system 110 on the highway. The processor 140 may analyze the data from the camera 120 which is acquiring the media or another camera in the vehicle 100 to determine if the driver or another passenger in the vehicle is operating the social media system 110.

In one embodiment, for example, the safety rules may also be based upon how a command requested was received by the social media system 110. For example, a request via a dedicated steering wheel button or audio commands (e.g., to acquire media, or to share the last media required) may have different limits than other interactions with the interface 170 which may require multiple input commands to the interface 170 from the user.

Figure 2:
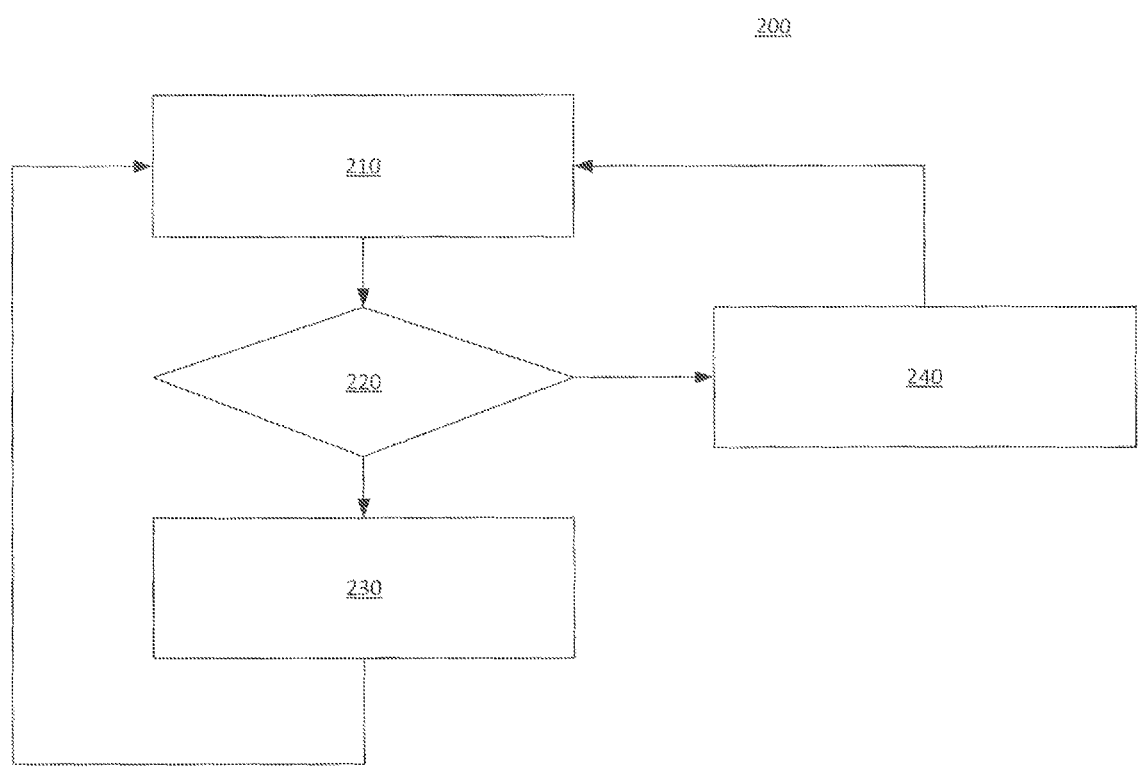
FIG. 2 is a flow diagram illustrating a method for operating a social media system, in accordance with an embodiment.

FIG. 2 is a flow diagram illustrating a method 200 for operating a social media system 110, in accordance with an embodiment. The method 200 begins when the processor 140 receives a command request from the driver or other passenger in the vehicle via the interface 170. (Step 210). The request may be, for example, to acquire media (photograph or video), to review the media, to share the media or to change a setting for the social media system 110.

The processor 140 then analyzes the command request to determine if the command request can be executed according to the safety settings. (Step 220). As discussed above, the safety settings include one or more rules based upon one or more factors, including, but not limited to, speed, traffic, location, lighting, weather, driver gaze direction, the attentiveness of the driver, the person requesting the command (e.g., driver or passenger), and/or how the command request was received.

If the processor determines that the command request can be completed, the processor 140 executes the command request. (Step 230). In other words, the processor 140 only allows use of the social media system 110 when the processor deems it safe. If the processor 140 determines that the command request cannot be completed according to the safety settings, the processor 140 does not execute the command request. (Step 240). In one embodiment, for example, the processor 140 may indicate why the command request was not completed. For example, if the vehicle is traveling above a posted speed limit, the processor may output, either visually on a display or audibly via a speaker, that the vehicle is travelling too quickly to use the social media system 110. The process then returns to step 210 to await the next command request.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A social media system for a vehicle, comprising:
a camera;
an interface;
a memory configured to store one or more safety settings; and
a processor communicatively coupled to the camera, the interface and the memory, the processor configured to:
receive, via the interface, a command request to utilize the social media system from a user, the command request comprising a request to take a picture or record a video with the camera;
determine, based upon the safety settings stored in the memory, when use of the social media system and execution of the command request is safe; and
executing the command request when the processor determines that use of the social media system and execution of the command request is safe.

2. The social media system according to claim 1, wherein the command request is to take a photograph or video of a driver of the vehicle via the camera.

3. The social media system according to claim 1, further comprising at least one sensor communicatively coupled to the processor, wherein the processor is further configured to determine when the command request may be completed based upon data from the at least one sensor.

4. The social media system according to claim 3, wherein one of the at least one sensors is a speed sensor.

5. The social media system according to claim 1, wherein the safety settings comprise a plurality of safety rules based upon at least one relating to the speed of the vehicle, the proximity of the vehicles to other vehicles and a location of the vehicle.

6. The social media system according to claim 5, wherein the safety rule comprises an absolute speed limit.

7. The social media system according to claim 5, wherein the safety rule comprises a speed limit relative to a posted speed limit.

8. The social media system according to claim 1, wherein the safety settings differ between a passenger and a driver and processor is further configured to:
determine if the command request is from the passenger or the driver;
determine, based upon the safety settings for the driver, when the command request may be completed when the command request is determined to be from the driver; and
determine, based upon the safety settings for the passenger, when the command request may be completed when the command request is determined to be from the passenger.

9. The social media system according to claim 1, wherein the interface comprises at least one steering wheel control dedicated to the social media system.

10. A method for operating a social media system in a vehicle, comprising:
receiving, by a processor, a command request to utilize the social media system from a user, the command request comprising a request to take a picture or record a video with a camera in the vehicle;
determining, by the processor, when use of the social media system and execution of the command request is safe based upon at least one safety rule; and
executing the command request when the processor determines that use of the social media system and execution of the command request is safe.

11. The method according to claim 10, wherein the safety rules differ between a passenger and a driver, the method further comprising:
determining, by the processor, if the command request is from a passenger or a driver;
determining, by the processor, based upon the safety rules for the driver, when the command request may be completed when the command request is determined to be from the driver; and
determining, by the processor, based upon the safety rules for the passenger, when the command request may be completed when the command request is determined to be from the passenger.

12. The method according to claim 10, further comprising:
receiving, by the processor, data from at least one sensor; and
determining, by the processor, when the command request may be completed based upon the received data and the at least one safety rule.

13. The method according to claim 12, wherein the data includes a speed of the vehicle, a proximity of other vehicles to the vehicle and a location of the vehicle.

14. The method according to claim 13, wherein at least one of the safety rules is based upon an absolute speed of the vehicle.

15. The method according to claim 13, wherein at least one of the safety rules is based upon a relative speed of the vehicle.

16. A non-transitory computer-readable medium storing instructions which, when executed by a processor, cause the processor to:
receive, via an interface, a command request to utilize a social media system in a vehicle from a user, the command request comprising a request to take a picture or record a video with a camera in the vehicle;
determine when use of the social media system and execution of the command request is safe based upon at least one safety rule; and
execute the command request when the processor determines use of the social media system and execution of the command request is safe.

17. The non-transitory computer-readable medium according to claim 16, wherein the safety rules differ between a passenger and a driver, the instructions further causing the processor to:
determine if the command request is from a passenger or a driver;
determine, based upon the safety rules for the driver, when the command request may be completed when the command request is determined to be from the driver; and
determine, based upon the safety settings for the passenger, when the command request may be completed when the command request is determined to be from the passenger.

18. The non-transitory computer-readable medium according to claim 16, the instructions further causing the processor to:
receive data from at least one sensor; and determine when the command request may be completed based upon the received data and the at least one safety rule.

19. The non-transitory computer-readable medium according to claim 18, wherein the data includes a speed of the vehicle, a proximity of other vehicles to the vehicle and a location of the vehicle.

20. The non-transitory computer-readable medium according to claim 16, wherein the safety rule is based upon an attentiveness of a driver.

* * * * *